(12) United States Patent
McGuffie

(10) Patent No.: US 9,855,490 B2
(45) Date of Patent: Jan. 2, 2018

(54) USER-PROPELLED COLLAPSIBLE APPARATUS

(71) Applicant: DIGITAL LINE MARKERS FZE, Sharjah (AE)

(72) Inventor: Iain Peter McGuffie, Nr. Bromyard (GB)

( * ) Notice: Subject to any disclaimer, the term of this patent is extended or adjusted under 35 U.S.C. 154(b) by 0 days.

(21) Appl. No.: 14/392,367

(22) PCT Filed: Jul. 15, 2014

(86) PCT No.: PCT/IB2014/063116
§ 371 (c)(1),
(2) Date: Feb. 1, 2016

(87) PCT Pub. No.: WO2015/015354
PCT Pub. Date: Feb. 5, 2015

(65) Prior Publication Data
US 2016/0206950 A1    Jul. 21, 2016

(30) Foreign Application Priority Data

Jul. 30, 2013 (GB) .................................. 1313541.3

(51) Int. Cl.
*A63C 19/06* (2006.01)
*A01D 34/82* (2006.01)
*B62B 5/06* (2006.01)

(52) U.S. Cl.
CPC .......... *A63C 19/065* (2013.01); *A01D 34/824* (2013.01); *B62B 5/067* (2013.01); *A63C 2019/067* (2013.01)

(58) Field of Classification Search
CPC .......................... A63C 2019/067; B62B 5/067
See application file for complete search history.

(56) References Cited

U.S. PATENT DOCUMENTS

| 3,357,716 | A | | 12/1967 | Musichuk | |
|---|---|---|---|---|---|
| 4,877,348 | A | * | 10/1989 | Opie | E01C 23/22 118/300 |
| 4,923,559 | A | * | 5/1990 | Kennedy | E01C 23/185 156/523 |
| 4,936,485 | A | * | 6/1990 | Downing | E01C 23/18 221/185 |
| 4,940,184 | A | * | 7/1990 | Smrt | A63C 19/06 116/284 |
| 5,054,959 | A | * | 10/1991 | Wilson | E01C 23/166 239/150 |
| 6,373,244 | B1 | * | 4/2002 | Nipp | G01C 15/02 324/235 |
| 8,192,108 | B1 | * | 6/2012 | Causey | E01C 23/163 239/156 |
| D711,432 | S | * | 8/2014 | Holt | D15/13 |
| 2009/0205566 | A1 | * | 8/2009 | McGuffie | A63C 19/08 118/664 |

(Continued)

*Primary Examiner* — Erez Gurari
(74) *Attorney, Agent, or Firm* — MU P.C.

(57) ABSTRACT

A user-propelled collapsible apparatus comprises a body (1) provided with wheels (21) and a retractable handle means (3) for propelling the apparatus. Bracing means (5) is provided for the handle means, the bracing means being movable between a deployed configuration in which the bracing means supports the extended handle means and a stored configuration in which the bracing means lies substantially adjacent to the body.

20 Claims, 5 Drawing Sheets

(56) References Cited

U.S. PATENT DOCUMENTS

| | | | | |
|---|---|---|---|---|
| 2013/0186698 A1* | 7/2013 | Sarokhan | ............... | B62B 5/026 180/7.1 |
| 2015/0190705 A1* | 7/2015 | McGuffie | ............. | A63C 19/065 222/185.1 |
| 2015/0290673 A1* | 10/2015 | Duncan | .................... | G01C 3/08 427/137 |
| 2015/0375091 A1* | 12/2015 | McGuffie | ............. | A63C 19/065 401/5 |
| 2016/0002868 A1* | 1/2016 | McGuffie | ............. | A63C 19/065 427/137 |

* cited by examiner

USER-PROPELLED COLLAPSIBLE APPARATUS

This invention relates to user-propelled collapsible apparatus, such as line marking apparatus or a lawn mower.

Line marking apparatus can be difficult to transport because of the size of a body of the apparatus and because the handle conventionally used to propel the apparatus extends a significant distance from a body of the apparatus. These aspects prevent conventional manually propelled line marking apparatus fitting within restricted transportation space, such as the boot of a conventional automobile. This also applies to lawn mowers and other similar apparatus. The handle makes it difficult to fit the lawn mower or the like into a restricted transportation space.

It is therefore an object of the present invention to provide a user-propelled collapsible which can be more readily placed within a restricted transportation space, such as the boot of an automobile.

According to the present invention there is provided a user-propelled collapsible apparatus comprising: a body provided with wheels and a retractable handle means for propelling the apparatus; and bracing means for the handle means, the bracing means being movable between a deployed configuration in which the bracing means supports the extended handle means and a stored configuration in which the bracing means lies substantially adjacent to the body.

The bracing means may comprise a cross-brace which, in the deployed configuration thereof, links two shafts of the handle means together. The cross-brace may be mounted on two arms, one arm being provided in the region of each side of the body and being mounted for pivoting relative to the body about a pivot point at that end of the arm remote from the cross-brace. The free ends of the arms may be interconnected by a shaft and the cross-brace may be mounted so as to be pivotable about the axis of the shaft.

The length of the shaft and the position of the arms on the body may be such that the arms lie outside the outer ends of a cross-member provided at the end of the handle means. Alternatively, the length of the shaft and the position of the arms on the body may be such that the arms are positioned laterally beyond the handle means.

The cross-brace may be provided with means for engaging with the handle means. For example, the cross-brace may comprise a plate-like portion which bears against the handle means and side flanges which engage with the outer sides of the handle means. The plate-like portion may alternatively comprise an arrangement of one or more struts which bears against the handle means and side flanges which engage the outer sides of the handle means. The cross-brace may include further flanges which engage with the inner sides of the handle means.

The cross-brace may include a lower portion which is pivotably mounted to the lower edge (in the use position) of the cross-brace and which extends within the handle means to engage with the inner sides of the handle means.

In the stored configuration, the cross-brace may bear against a rear or front region of the body and may close an opening in the rear or front region of the body. The lower portion of the cross-brace may lie between the plate-like portion or arrangement of one or more struts and the opening in the body. The flanges may also lie within the opening or alternatively may extend around the outside of the body.

The handle means may be telescopic.

In the deployed configuration, a rearward facing side of the bracing means may be provided with at least one hook, or preferably two hooks, which in use may support at least one container, such as a bag, of fluid, such as line marking material or water. The at least one hook is ideally arranged such that the point of support for the container is at a sufficiently high level for the contents of the or each container to flow into the apparatus under the influence of gravity. Further, the hooks are ideally arranged such that the point of support for the at least one container is between the front and rear axle axes of the apparatus.

A switch may be provided on the handle means in order to control operation of the apparatus. A cable for the switch may be arranged on a reel which is biased to retract the cable. The switch may be detachable from the handle means if desired such that, when detached, the switch is biased to be retracted towards the reel.

The apparatus may be in the form of a line marking apparatus.

Alternatively, the apparatus may be in the form of a lawnmower.

For a better understanding of the present invention and to show more clearly how it may be carried into effect reference will now be made, by way of example, to the accompanying drawings in which.

Figure 1:
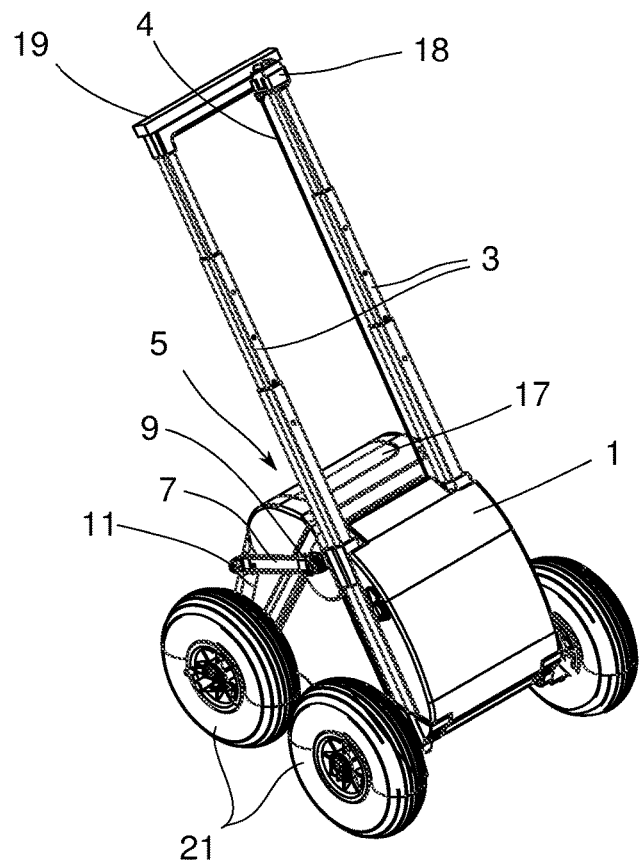
FIG. 1 is a perspective view of part of one embodiment of a user-propelled collapsible apparatus according to the present invention in the form of a line marking apparatus.

The line marking apparatus shown in FIG. 1 comprises a body 1 which is provided with wheels (not shown in FIG. 1) and with a handle 3 for manually propelling the apparatus. The body 1 houses a number of components conventionally provided for dispensing line marking material, such as a pump, battery and pressure regulator. However, the body 1 is of a size too small to accommodate a sufficient amount of line marking material and/or water.

The handle 3 is retractable so as to retract substantially to the body 1 when the apparatus is not in use and to extend a distance from the body when the apparatus is in use. The extended configuration is shown in FIG. 1. The mechanism by which the handle 3 is retractable and extendable (i.e., telescopic) is in itself conventional and may be essentially the same as a retractable and extendable handle used for suitcases. Such a handle is known, for example, from U.S. Pat. No. 5,108,119. Suitcase handles, though, are generally intended for pulling a suitcase, while in a line marking apparatus the handle is used for pushing the apparatus in order that the user can look forward to determine a line to be marked by the apparatus. As a result, known retractable handles tend to be relatively weak and have been found to be unsuitable for use in line marking apparatus. One option is to strengthen the handle, for example by using thicker materials, but there is still a degree of movement due to the manner in which the sections of the handle slide within each other and this can lead to damage to the handles, for example as a result of twisting.

However, it has been found that such a handle can be strengthened and supported sufficiently for the handle to be used reliably in combination with a line marking apparatus by providing a bracing means, such as a cross-brace 5, the cross-brace in a deployed configuration thereof linking the two shafts of the handle together. Nevertheless, the manner in which such a cross-brace is provided is important if the advantage of reduction in the size (that is, the envelope of the apparatus) is to be maintained. To this end, the cross-brace 5 shown in FIG. 1 is mounted on two arms 7, one arm being provided in the region of each side of the body 1 and being mounted for pivoting relative to the body about a pivot point 9 at that end of the arm remote from the cross-brace 5. As shown in FIG. 1, the free ends of the arms 7 are interconnected by a shaft 11 and the cross-brace 5 is mounted so as to be pivotable about the axis of the shaft. For example, the cross-brace may be securely attached to the shaft 11 and the shaft may be rotatable relative to the arms 7, or the shaft may be securely attached to the arms and the cross-brace may be pivotable about the shaft, or both the arms and the cross-brace may be pivotable relative to the shaft.

The cross-brace 5 is provided with means for engaging with the handle 3. As shown in FIG. 1 the cross-brace 5 comprises a plate-like portion 13 which bears against the handle 3 and side flanges 15 which engage with the outer sides of the handle. Further engagement with the shafts of the handle 3 may be provided if desired. For example, further flanges may be provided which engage with the inner sides of the handle shafts.

As shown in FIG. 1, optionally the cross-brace 5 may include a lower portion 17 which is pivotably mounted to the lower edge (in the use position) of the cross-brace and which extends within the handle shafts to engage with the inner sides of the handle shafts.

The cross-brace 5 therefore serves to strengthen and support the two shafts of the handle 3 and to resist twisting of the handle. This makes the handle sufficiently strong for extended use as part of the line marking apparatus.

In use of the line marking apparatus of FIG. 1, with the handle 3 substantially retracted into the body 1, the arms 7 are pivoted downwardly such that the cross-brace 5 is in a stored configuration in which it lies substantially adjacent to the body, for example the cross-brace may bear against a rear region of the body 1 and may close an opening in the rear region of the body. Alternatively, the cross-brace may bear against a front region of the body and may close an opening in the front region of the body. The lower portion 17 of the cross-brace, where provided, lies between the plate-like portion 13 and the opening in the body and the flanges 15 also lie within the opening, but alternatively the flanges may extend around the outside of the body. The length of the shaft 11 and the position of the arms 7 on the body 1 is such that the arms lie outside the outer ends of any cross-member 19 provided at the end of the handle 3 or otherwise are positioned laterally beyond the handle.

In order to deploy the line marking apparatus, the arms 7 are pivoted upwardly and the cross-brace 5 (or the plate-like portion 13 thereof) is also pivoted upwardly such that they are positioned forward of the line of the handle 3 when extended. The handle is then extended and the cross-brace 5 is released to engage the handle and reinforce the same thereby allowing the apparatus to be pushed by a user.

As will be explained in more detail hereinafter, the rearward facing side of the cross-brace 5, in particular the plate-like portion 13, may be provided with one, or preferably two, hooks which in use support one or more containers, such as bags, of line marking material or water. The hooks are ideally arranged such that the point of support for the containers is at a sufficiently high level for the contents of the or each container to flow into the apparatus under the influence of gravity and is sufficiently forward to be forward of a vertical line from a rear axle axis of the apparatus. In practice, the apparatus has two front wheels and two rear wheels and the effect of the containers is therefore between the axles axes of the two sets of wheels and does not adversely affect the stability of the apparatus with regard to tilting (as would occur if the point of support was rearward of the rear axle axis of the apparatus).

The apparatus is collapsed by removing any line marking material and/or water containers and then retracting the handle while lifting the cross-brace 5 away from the handle shafts. The cross-brace 5 can then be folded down and the arms 7 lowered in order for the cross-brace to cover the aperture at the rear of the body 1.

In this way, the line marking apparatus is collapsible inasmuch as the handle is retractable towards the body of the apparatus and the cross-brace forms a rear closure for the body of the apparatus when the apparatus is to be stored or transported and can secure any contents within the body. Thus, not only is the overall height of the apparatus is significantly reduced, but also the footprint of the apparatus can be reduced compared with other line marking apparatus because the body does not incorporate containers for storing line marking material and/or water. Clearly, the cross-brace 5 could take other forms and need not be a solid plate, but alternatively could be, for example, an arrangement of one or more struts which engage around the handle 3 and also provide means for supporting a container of line marking material and/or water.

It is conventional to provide a switch on the handle, for example on or close to the cross member 19, in order to control a spray of line marking material. This involves providing a cable, such as an electrical cable, between the body 1 and the switch. There is excess cable when the handle is retracted which could become entangled with the handle itself or with other objects. In order to prevent entanglement of the cable, the cable can be arranged on a reel which is biased to retract the cable as the handle is retracted, while allowing the cable to unwind from the reel as the handle is extended. The switch itself may be detachable from the handle if desired such that, when detached, the switch is retracted to lie adjacent to the reel during storage or transportation of the apparatus.

In the case of a lawn mower, it would generally not be necessary to hang containers from the cross-brace, but the cross-brace will strengthen and reinforce the retractable handle and allow the lawn mower to be pushed by a user to cut grass without damaging the retractable handle. The body will, of course, contain grass cutting means and optionally storage means for cut grass. Alternatively, storage means for cut grass may be provided at an opening at the rear of the body, which opening is closed by the cross-brace when the lawn mower is not in use.

Figure 2:
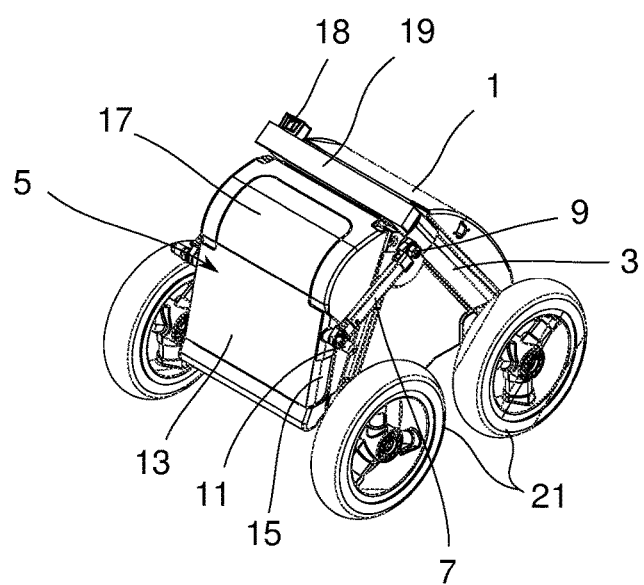
FIG. 2 is a side view of another embodiment, in a first configuration, of a user-propelled collapsible apparatus according to the present invention in the form of a line marking apparatus.
Figure 3:
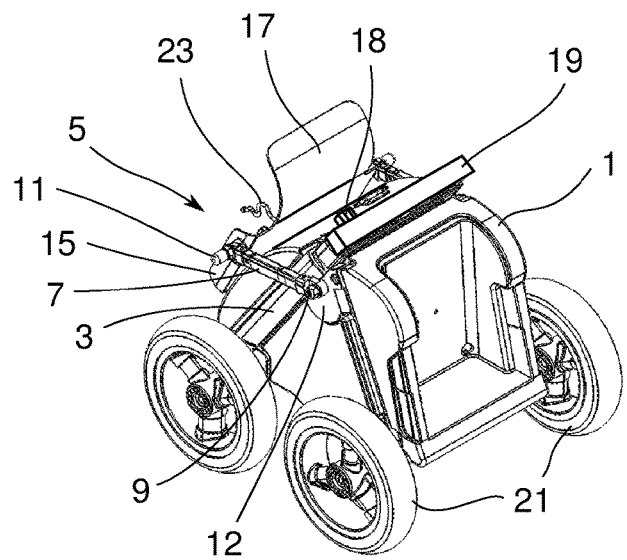
FIG. 3 is a side view of the line marking apparatus of FIG. 2 in a second configuration.
Figure 4:
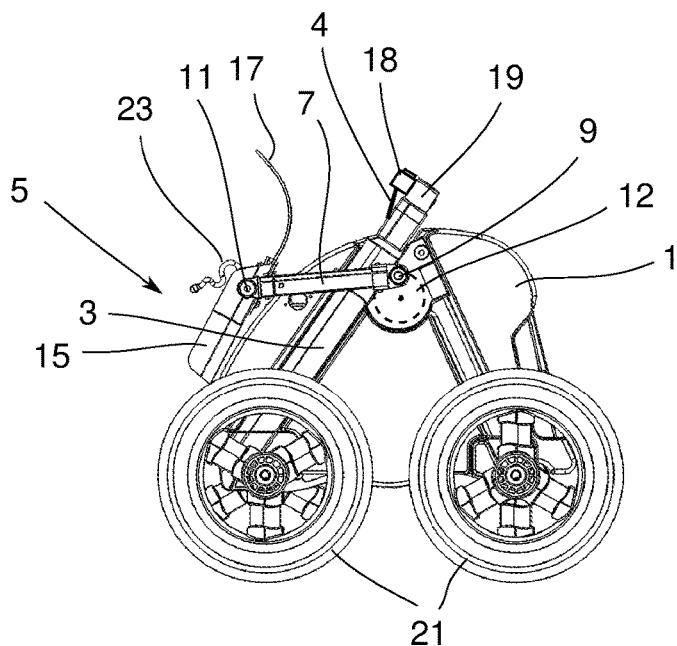
Figure 5:
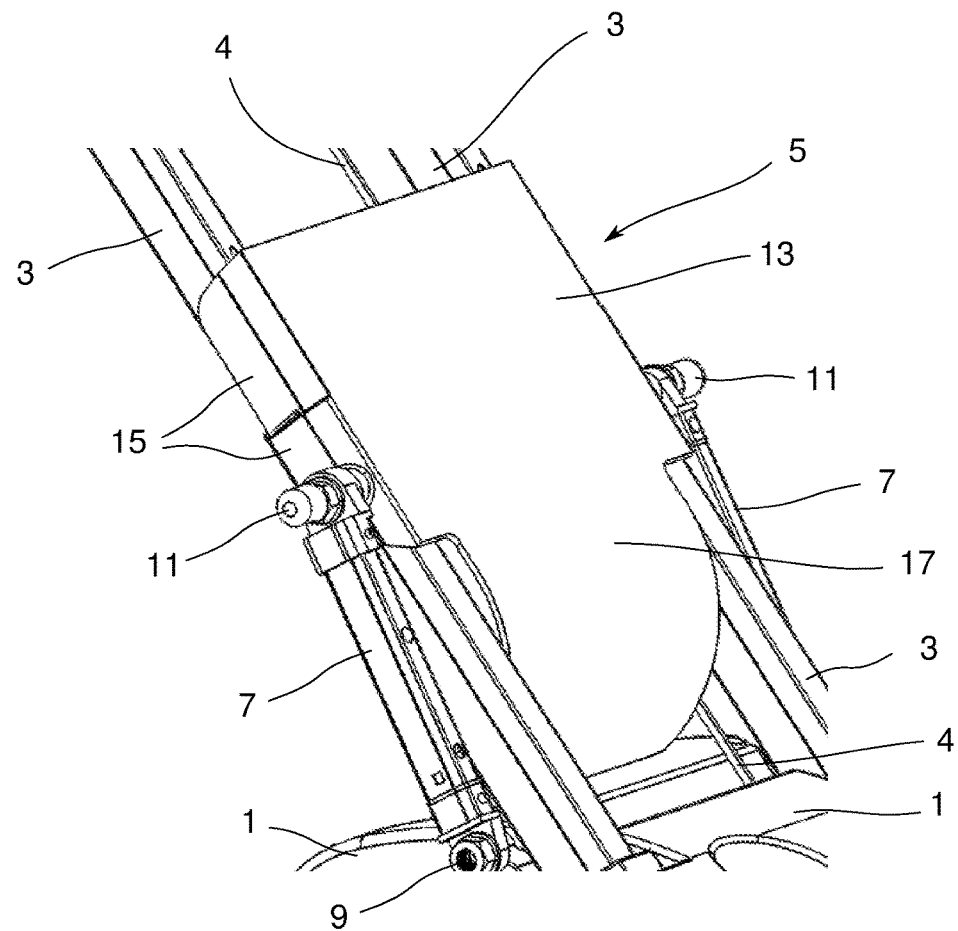
Figure 6:
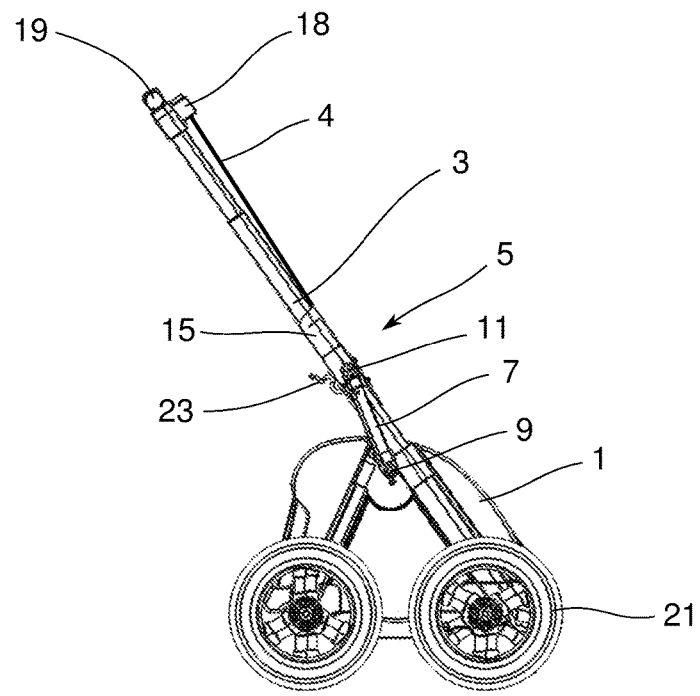
Figure 7:
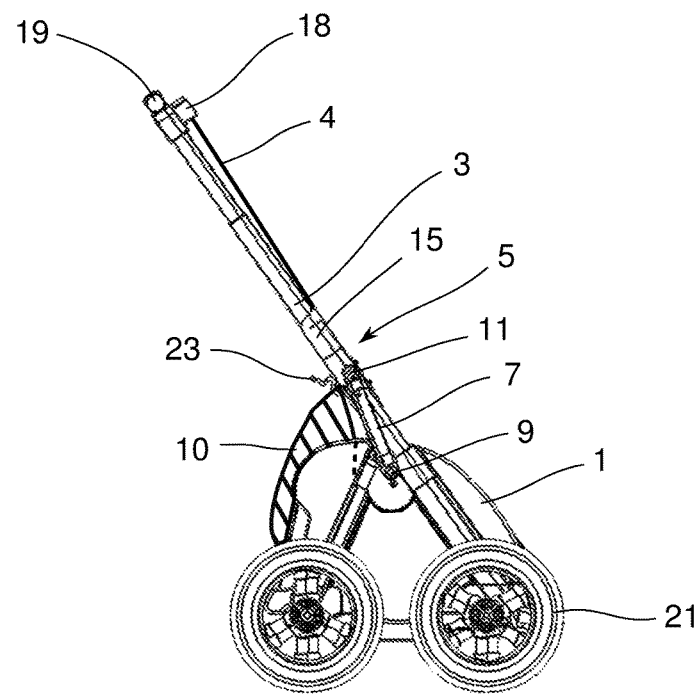
Figure 8:
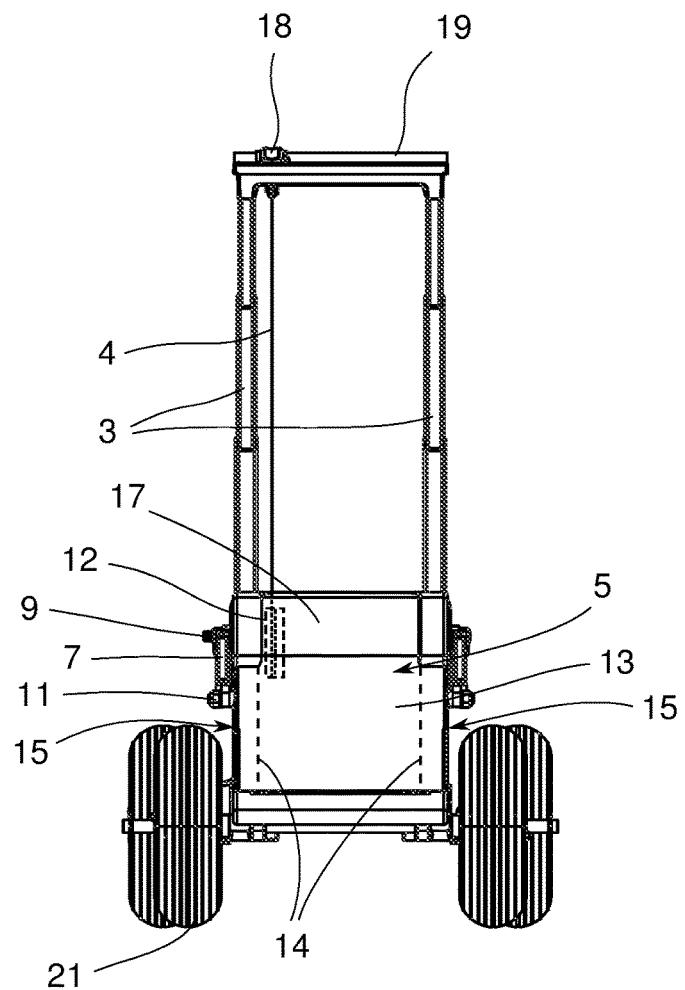

The line marking apparatus shown in FIGS. 2 and 3 is similar to that of FIG. 1 and the same references are used to denote the same or similar features. The apparatus of FIGS. 2 and 3 differs from that of FIG. 1 in particular in that the cross-member does not include a lower portion and in that the wheels 21 and a hook 23 for a bag of line marking material or water is shown. Also, the cross-brace 5 is not pivoted about a lower end of the plate-like portion, but instead is pivoted at a point between the lower and upper ends of the cross-brace. It should be noted that the line marking apparatus would not generally adopt the configuration shown in FIG. 2 with the handle extended and the cross-brace lowered because in practice the cross-brace would be raised so as to pass above the upper end of the handle before the handle is extended to such a degree as to prevent this occurring. The cross-brace can then be lowered onto the handle shafts to strengthen and reinforce the handle.

I claim:

1. A user-propelled collapsible apparatus comprising: a body provided with wheels and components for dispensing line marking material, and a retractable handle for propelling the apparatus; wherein the apparatus is a line-marking apparatus, the body includes a housing for the components for dispensing line marking material and the handle is telescopically retractable substantially into the housing.

2. The apparatus of claim 1, comprising bracing means for the handle, the bracing means being movable between a deployed configuration in which the bracing means supports the extended handle and a stored configuration in which the bracing means lies substantially adjacent to the body, wherein the bracing means comprises a cross-brace which, in the deployed configuration thereof, links two shafts of the handle together.

3. The apparatus of claim 2, wherein the cross-brace is mounted on two arms, one arm being provided in the region of each side of the body and being mounted for pivoting relative to the body about a pivot point at that end of the arm remote from the cross-brace.

4. The apparatus of claim 3, wherein the free ends of the arms are interconnected by a shaft and the cross-brace is mounted so as to be pivotable about the axis of the shaft.

5. The apparatus of claim 4, wherein the length of the shaft and the position of the arms on the body are such that the arms lie outside the outer ends of a cross-member provided at the end of the handle.

6. The apparatus of claim 4, wherein the length of the shaft and the position of the arms on the body are such that the arms are positioned laterally beyond the handle.

7. The apparatus of claim 2, wherein the cross-brace is provided with means for engaging with the handle.

8. The apparatus of claim 7, wherein the cross-brace comprises a plate-like portion which bears against the handle and side flanges which engage with the outer sides of the handle.

9. The apparatus of claim 8, wherein the cross-brace includes further flanges which engage with the inner sides of the handle.

10. The apparatus of claim 2, wherein the cross-brace includes a lower portion which is pivotably mounted, in the use position, to the lower edge of the cross-brace and which extends within the handle to engage with the inner sides of the handle.

11. The apparatus of claim 2, wherein, in the stored configuration, the cross-brace bears against a rear or front region of the body and closes an opening in the rear or front region of the body.

12. The apparatus of claim 11, wherein the lower portion of the cross-brace lies between the plate-like portion and the opening in the body.

13. The apparatus of claim 11, wherein the flanges like within the opening.

14. The apparatus of claim 11, wherein the flanges extend around the outside of the body.

15. The apparatus of claim 2, wherein, in the deployed configuration, a rearward facing side of the bracing means is provided with at least one hook for supporting at least one fluid container.

16. The apparatus of claim 15, wherein the at least one hook is arranged such that the point of support for the at least one container at a sufficiently high level for the contents of the container to flow into the apparatus under the influence of gravity.

17. The apparatus of claim 15, wherein the at least one hook is arranged such that the point of support for the at least one container is between front and rear axle axes of the apparatus.

18. The apparatus of claim 1, and including a switch provided on the handle in order to control operation of the apparatus.

19. The apparatus of claim 18, wherein a cable for the switch is arranged on a reel which is biased to retract the cable.

20. The apparatus of claim 19, wherein the switch is detachable from handle such that, when detached, the switch is biased to be retracted towards the reel.

* * * * *